May 10, 1949.  A. P. McKAY  2,469,605
CONNECTING AND OPERATING MECHANISM
FOR TRACTOR DRAWN DEVICES
Filed June 7, 1944  2 Sheets-Sheet 1
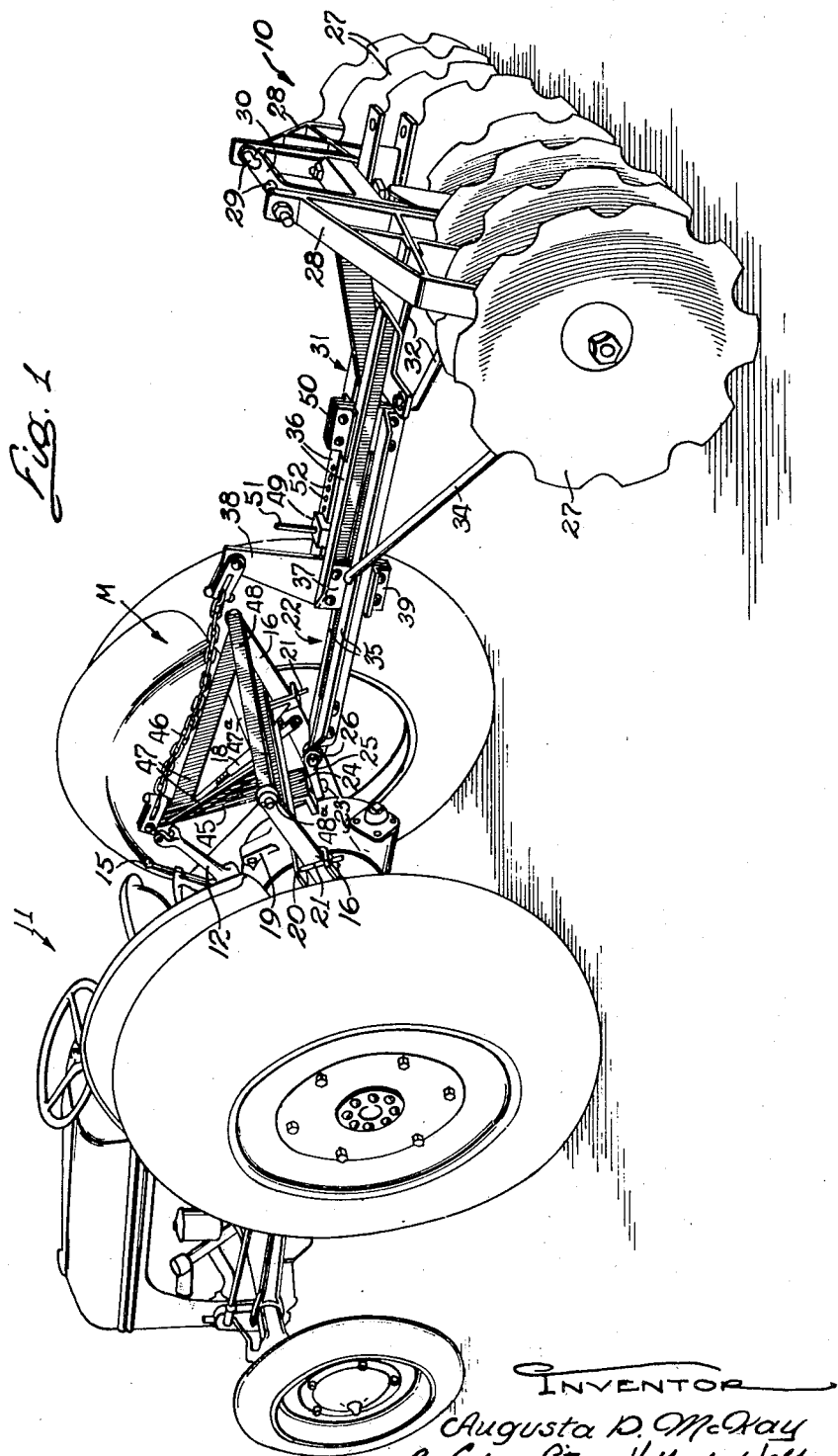

May 10, 1949.
A. P. McKAY
2,469,605
CONNECTING AND OPERATING MECHANISM
FOR TRACTOR DRAWN DEVICES
Filed June 7, 1944
2 Sheets-Sheet 2
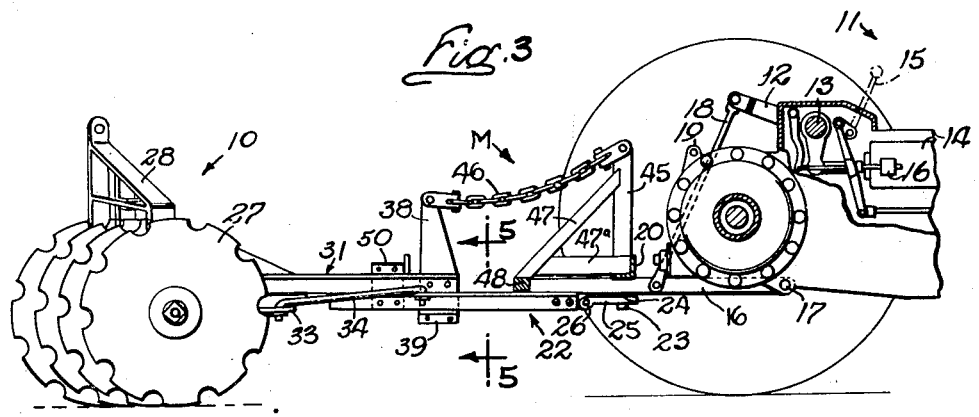
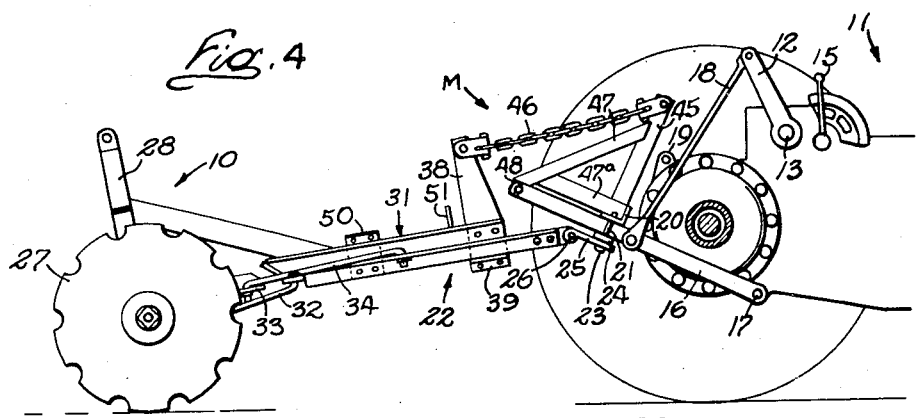
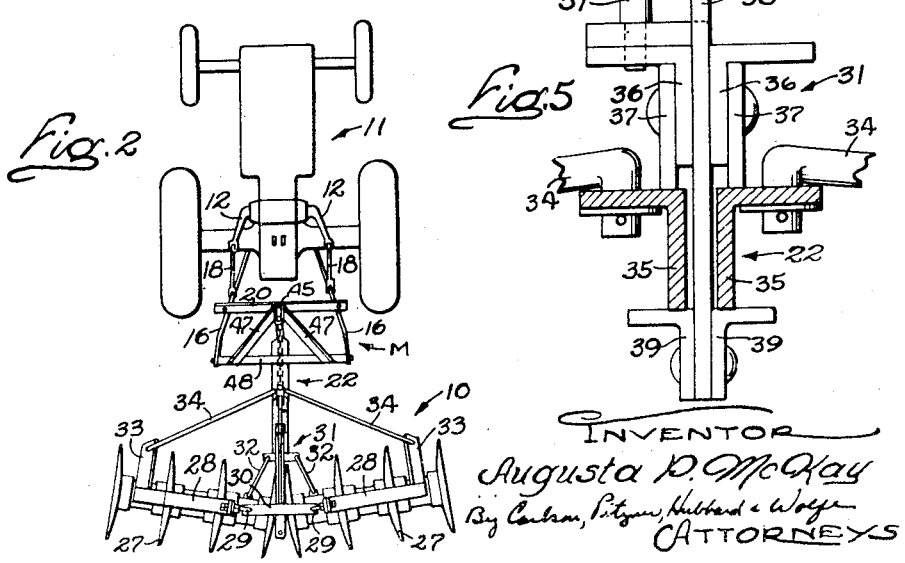
INVENTOR
Augusta P. McKay
By Carlson, Pitzner, Hubbard & Wolfe
ATTORNEYS Patented May 10, 1949

2,469,605

UNITED STATES PATENT OFFICE 2,469,605

CONNECTING AND OPERATING MECHANISM FOR TRACTOR DRAWN DEVICES

Augusta P. McKay, Cedartown, Ga., assignor to Rome Plow Company, Cedartown, Ga., a corporation of Georgia Application June 7, 1944, Serial No. 539,126

16 Claims. (Cl. 55—81)

1

The present invention pertains to a novel connecting or hitch mechanism for tractors and which embodies an arrangement for effecting power operation from the tractor of a selectively movable instrumentality incorporated in the trailed device which the hitch connects to the tractor. For example, the trailed device may be an agricultural implement having some instrumentality which needs be shifted from working to non-working position, or vice versa, by power derived from the tractor.

The general aim of the invention is to provide such a mechanism which is characterized by its ruggedness and simplicity of construction, the ease with which it may be applied to or disconnected from a tractor, the freedom of motion which it affords the trailed device without interference with the transmission of operating power to an instrumentality incorporated in such device, and the close coupling which it attains between tractor and trailer.

A more specific object of the invention is to provide a mechanism which is adapted to be removably attached to a pair of power-operated, pivoted tension links trailing from the rear end of a tractor, such as are provided as standard equipment on many tractors in use today, and which mechanism is adapted not only to apply the draft load to these tension links but at the same time to utilize their generally vertical swinging motion (imparted to them by power from the tractor) for moving an instrumentality on the trailed implement or other device in a desired direction, as for example generally fore and aft of the latter.

Another object is to provide a mechanism of the type indicated which is closely correlated with, and indeed may form a part of, the trailed device.

In its more limited aspects, the invention also resides in a novel harrow construction in which the mechanism is herein illustrated as being incorporated.

Further objects and advantages of the invention will become apparent as the following description proceeds, taken in connection with the accompanying drawings in which:

Figure 1 is a perspective view of a tractor trailing a harrow and connected to the latter by a mechanism embodying the present invention.

Fig. 2 is a plan view, on reduced scale, of the apparatus shown in Fig. 1 but with the harrow in angled or working position rather than in the non-angled transport position of Fig. 1.

Figs. 3 and 4 are fragmentary side elevations showing the rear end portion of the tractor in longitudinal section and with the harrow adjusted respectively in angled or working position and zero angle or non-working transport position.

Fig. 5 is an enlarged detail sectional view through the draft beam, taken substantially along the line 5—5 in Fig. 3.

2

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Referring more particularly to the drawings (see Fig. 1), the invention has been exemplified therein as embodied in a combined connecting and operating mechanism at M for attaching a heavy duty disk harrow 10 to a tractor 11.

The tractor itself may, of course, take a variety of forms and has been illustrated simply as being one of well-known commercial design. On the upper rear portion of the tractor is a power-operated lift means comprising a pair of arms 12 fixed to a transverse shaft 13 (Fig. 3) and adapted to swing in unison in a limited arc about the center of the shaft. The construction and operation of this and similar power units or power take-off devices for tractors is well-known in the art and, of course, such unit may take a variety of forms. Simply for purposes of exemplification, the power unit here shown, as well as the associated tractor-mounted links to which it is connected, are substantially the same as those disclosed in Ferguson Patent No. 2,118,180, issued May 24, 1938, and, accordingly, detailing here is unnecessary. For the present, suffice it to say that a hydraulic ram indicated at 14 in Fig. 3 is adapted to swing the arms 12 upward from the position of Fig. 3 to that of Fig. 4. Supply of pressure fluid to the ram to raise the arms 12 may be controlled manually by a lever 15. Shifting of the lever 15 from the position of Fig. 3 to that of Fig. 4 actuates a valve at 16 to admit pressure fluid to the ram and thus raise the arms 12. Return of the lever 15 to the position of Fig. 3 exhausts pressure fluid from the ram, permitting the arms 12 to descend under the gravity load imposed on them.

A pair of generally divergent tension links 16 project rearwardly from the tractor, being pivoted at 17 on the tractor frame to swing about a common horizontal axis located beneath and somewhat forwardly of the rear axle of the tractor. These links are suspended from respective ones of the lifter arms 12 by depending links 18 loosely pivoted at their opposite ends to the lifter arms 12 and tension links 16. In addition to tension links corresponding to the tension links 16, the Ferguson Patent No. 2,118,180 identified above also discloses an upper or compression link which would normally be connected to a pivoted carrier on the apertured lug 19 and arranged to effect automatic actuation of the valve 16. Any showing of such an upper or compression link has been omitted in the present instance, however, since the mechanism M is adapted to utilize the tension links 16 alone for all manipulations of the harrow or other trailed device.

It is to the pair of power-operated tension links 16 that the connecting mechanism M embodying the present invention is shown as applied. In brief, this mechanism M is such that the draft load of the device being trailed, here the harrow 10, is not only applied as a tension force to these links, but in addition the generally vertical swinging motion imparted to these links by the power actuated lifter arms 12 is utilized by the connecting mechanism for positionally adjusting an instrumentality incorporated in the trailed device, in the present instance for shifting the harrow gangs between angled working position and non-angled transport position.

In the particular construction illustrated, the connecting mechanism M comprises a crossbar 20 dimensioned to span the intermediate portions of the links 16 and removably secured to them at its opposite ends. To secure the ends of the bar to the links, such ends of the bar are provided with couplings having outwardly facing channels thereon of generally U-shape (see Fig. 1) and through which removable pins 21 may be passed if desired. The ends of the bar embrace the links 16 but the draft load on the bar 20 is, however, transmitted from the latter to the links principally through a drawbar on the trailing ends of the links, as will hereinafter appear, rather than directly through the ends of the bar 20 to the links.

The trailing harrow 10 is arranged to swing laterally about substantially the center of the bar 20 and for that purpose a draft beam, designated generally as 22, is pivoted on a king pin 23 (Figs. 1 and 3) carried by a bracket 24 rigid with the central portion of the bar 20. It is to afford a close coupling between the tractor 11 and implement 10 that the bar 20 carrying the pivot 23 is located on the intermediate portions of the links 16, or, in other words, at a point such that the pivot is located closely adjacent the rear axle of the tractor rather than on a drawbar out at the extreme ends of the links. Such close coupling insures accurate trailing or following of the implement with reference to the tractor and minimizes the radius of turn for the equipment. It is to be observed, incidentally, that the rigid joining of the links 16 by the mechanism M substantially prevents their swinging laterally at their pivot points 17.

Independent rise and fall of the tractor and harrow, as, for example, in passing over uneven ground, is made possible by a hinge connection between the king pin 23 and draft beam 22. Such connection includes a plate 25 journaled on the king pin and having a transverse or horizontal hinge pin 26 connecting its rear end to the adjacent forward end of the draft beam. The hinge connection noted also serves to permit upward tilting of the links 16 (from the position of Fig. 3 to that of Fig. 4) for a purpose later to appear, without bodily lifting of the heavy harrow structure 10. As is clear from Fig. 4, there is some tilting of the harrow and draft beam incident to such upward movement of the links 16 but this incidental motion is minimized by locating the hinge point 26 well forward on the links 16 or, in other words, fairly close to their pivots 17.

The harrow illustrated typifies trailed devices or implements embodying an instrumentality adapted to be positioned by power from a tractor and which the present connecting mechanism M is adapted to accommodate. In this instance the harrow comprises a pair of disk gangs 27 carried by respective sub-frames 28 pivoted at 29 and at aligned lower points (not shown) to a central upstanding frame 30 of rectangular form. The gangs are so pivoted as to swing fore and aft about vertical axes passing through the pivot points 29. The frame 30 is rigid with the rear end of a slide, designated generally as 31, which is movable longitudinally relative to the draft beam 22. Tie rods 32 are pivoted at their forward ends to the slide 31 and are loosely pivoted at their rear ends to respective ones of sub-frames 28 so as to prevent substantial fore and aft motion of the gangs relative to the slide. On the other hand, brackets 33 (Fig. 2) project forwardly from the outer end portions of the gang sub-frames 28 and are connected by pivoted rods 34 to the draft beam 22. Accordingly, when the slide 31 is pulled forward on the draft beam 22 the gangs pivot forwardly about the rear ends of the rods 34, swinging into the aligned position of Fig. 4 in which the disks have a substantially zero angle relative to the line of draft and roll along freely for transport. Conversely, when the slide 31 is released to slide rearwardly on the draft beam, the engagement or drag of the ground with the disks causes the inner ends of the gangs to swing rearwardly so that they take up the angled working position of Fig. 3.

As to the details of the illustrated draft beam and slide, the draft beam 22 comprises a pair of bars 35 of inverted L-shaped cross-section (see Fig. 5) rigidly joined together at their opposite ends and having their adjacent portions spaced apart to define a guideway for the slide therebetween. The slide 31, on the other hand, comprises a pair of longitudinally extending bars 36, also of inverted L-shaped cross-section, having blocks 37 bolted to their forward end portions and adapted to ride along the upper surfaces of the draft beam bars 35. Clamped between the bars 36 is an upright post 38 passing downwardly through the guideway defined in the draft beam and having a pair of angles 39 bolted to its lower end and positioned to ride along the lower edges of the draft beam bars 35.

To convert the upward swinging motion of the power-operated links 16 on the tractor 11 into a magnified fore and aft motion suitable for operating the slide 31, a standard or upright 45 is rigidly fixed to the center of the bar 20 and projects upwardly therefrom a substantial distance. A flexible or one-way operating connection or member in the form of a chain 46 joins the upper end of the standard 45 to the post 38 on the slide 31. Upon reference to Figs. 3 and 4 it will be seen that the geometry of the parts is such that an upward swing of the link 16, which causes but a negligibly small forward movement of the draft beam 22, results in a comparatively large forward motion of the upper end of the standard 45 so that the slide 31 is pulled forward along the draft beam the requisite distance for de-angling the harrow gangs. In a more general sense, the location and height of the standard attached to the links may be selected to produce, within operating limits, a forward pull of any desired extent, whether or not the draft connection is such as also to entail an incidental movement of the implement.

Rigid bracing of the standard 45 is afforded by a pair of struts 47 which are attached to its upper portion and extend rearwardly and downwardly, their divergent lower ends being rigidly fixed to a drawbar 48. The latter parallels the previously mentioned bar 20 and its opposite ends are, like those of the bar 20, attached to the links 16, in this instance to the latter's trailing ends. Reduced end portions of the drawbar have universal joint connections to the links and are secured against displacement by pins 48a. A second pair of angularly related struts or braces 47a extend from the center of the bar 20 rearwardly to the drawbar 48, being rigidly fixed to both bars, and transmit the draft load in compression from the bar 20 to the drawbar 48.

By way of summary of the operation of the apparatus shown, it may be assumed first of all that the tractor 11 is moving forward with the links 16 in lowered or substantially horizontal position (see Fig. 3). In such case the drawbar 48 rests on the top of the draft beam 22, this engagement limiting the downward swing of the drawbar and links, and the standard 45 is substantially vertical. Accordingly, the chain 46 is slacked off and the drag of the ground on the harrow disks retains the harrow gangs to the rearwardly angled position shown in Figs. 2 and 3. The distance which the inner ends of the gangs are displaced rearwardly of their outer ends in assuming such angled position is adjustably determined by an abutment or block 49 (Fig. 1) carried by the slide 31 and positioned in the guideway between the bars 35 of the draft beam 22 to engage stop block 50 fixed to the beam and closing the rear end of such guideway. A pin 51 is adapted to engage in any selected one of a series of holes 52 in the slide 31 to determine adjustably the position of the block 49 longitudinally of the slide.

With the harrow in the working condition just described, the draft load on it is transmitted through the slide 31 and engaging blocks 49, 50 to the draft beam 22 as well as through rods 34 to the draft beam, the chain 46 remaining slack. From the beam 22 the draft load is transmitted through the king pin 23 and thence through the bar 20 and in compression through the angle braces 47a back to the drawbar 48. From the latter it is applied to the trailing ends of the tension links and by them to the tractor frame at pivots 17.

As the tractor and implement move ahead, relative rise and fall of the tractor and implement in passing over irregular ground contour is permitted by the hinge 26 and pivots 17. If the tractor pitches downward the hinge 26 permits the links 16 to tilt downward and forward relative to the draft beam, whereas if the tractor nose goes up, as in going up a rise in the ground, the links 16, in effect, tilt upward relative to the tractor about the pivots 17. During any nosing up of the tractor the bottoming of the drawbar 48 against the draft beam prevents the links 16 from swinging upward about the hinge 26, relative to the draft beam, beyond a position of alignment with such beam. In consequence, after a limited nosing up of the tractor the ram piston will abut against the end of its cylinder as a result of the upward swinging of the links 16 relative to the tractor. After such abutment of the piston and cylinder any further nosing up of the tractor is resisted by the then solid linkage connection from the upper portion of the rear end of the tractor back to the point of ground engagement for the implement. The chain 46 remains sufficiently slack in event of either up or down swing of the links 16 that it does not disturb the slide. Similarly, upon turning of the tractor to right or left the draft beam pivots about the king pin 23, the close coupling afforded by the location of the latter adjacent the rear end of the tractor insuring a short turning radius for the tractor and implement combination. Even with an extreme degree of lateral swing of the draft beam 22, it remains beneath the drawbar 48, being guided in some degree by it in its lateral movement. The loose jointed character of the pivotal connections afforded at 29 and 32 between the inner ends of the harrow gangs permits the relative movement of the same required as an incident to passage over rough ground.

To adjust the harrow for transport, the tractor driver has only to pull back the hydraulic control lever 15 (from the position of Fig. 3 to that of Fig. 4) and without necessity for any interruption in the forward travel of the tractor. Thereupon the hydraulic lifter arms 12 pull up the links 16, canting the standard 45 forward. That pulls the chain 46 taut and draws the slide 31 forward along the draft beam 22 so that the harrow gangs are drawn into de-angled or non-working position (Figs. 1 and 4).

Application or removal of the mechanism M is, of course, a simple matter. All that need be done is to connect or disconnect the pair of bars 20, 48 with reference to the links 16.

I claim as my invention:

1. In a mechanism for attaching an implement or the like to a tractor having a pair of power operated links trailing side by side from its rear end and pivoted on the tractor at their forward ends to swing up and down about a horizontal axis, the combination of a draft member having a slide mounted thereon for fore and aft sliding motion, a standard, means hingedly connecting the lower end portion of said standard to the front end portion of said draft member for tilting motion of the standard in a direction generally fore and aft of such member while affording lateral swinging motion of the draft member relative to the standard, an operating connection between the upper end portion of said standard and said slide, a drawbar located above said draft member extending generally transversely of the same and arranged for free movement toward and away from the draft member in a generally vertical direction, said drawbar being displaced rearwardly of the standard and having means on its ends for detachably securing the same to the trailing end portions of the links on the tractor, means including a compression member rigidly connecting the drawbar to the standard and means extending laterally from the lower end portion of said standard for connecting the same to the intermediate portions of said links.

2. In a hitch mechanism for a tractor having a pair of horizontally spaced links pivoted on its rear portion and extending rearwardly therefrom together with power means on the tractor for swinging said links upwardly about their pivots, the combination of a bar dimensioned to span the space between said links, means for securing the ends of said bar to respective ones of said links and restraining said bar against fore and aft tilting with reference to the links, an upright rigid with said bar whereby said upright is caused to rock fore and aft as said bar is swung vertically about the pivotal axis of the links by raising and lowering the latter, pivot means on the intermediate portion of said bar for connecting the draft member of a trailed device thereto, and means for connecting a movable operating member to the upper portion of said upright, whereby the fore and aft rocking of said upright incident to raising and lowering of the links serves to move said operating member in a fore and aft direction at its point of attachment to said upright.

3. In a hitch mechanism adapted to be secured to a pair of horizontally spaced links trailing from the rear end portion of a tractor and pivoted thereon to swing about a horizontal axis, the combination of a bar adapted to span the space between intermediate portions of said links, means for detachably securing the opposite ends of said bar to the intermediate portions of said links, pivot means connected to the central portion of said bar for connecting a draft member in trailing pivoted relation thereto, a second bar disposed in spaced and generally parallel relation to the first-mentioned bar and located behind the latter, means for removably securing the ends of said second bar to the trailing end portions of respective ones of said links, an operating standard rigidly secured to the central portion of the first-mentioned bar and projecting upwardly therefrom for fore and aft motion of the upper end of said standard with reference to said pivot means as said links are swung about their pivotal axis, and a brace connecting said standard to the second bar to prevent rearward bending of the standard.

4. In a hitch for operatively connecting an implement having a part to be actuated to power actuated vertically swingable draft means on a tractor, the combination of means for connecting the implement to the draft means, a standard, means for rigidly connecting said standard to the draft means in upstanding relation thereto for bodily movement therewith, and a connector having its forward end connected to the upper portion of said standard and its rearmost end adapted for connection with the part to be actuated on said implement, the location of said standard with respect to said draft means and of said connector with respect to said standard being such as to produce a predetermined component of movement of said connector relative to said draft means upon a vertical swinging movement of the latter.

5. The combination of a draft member having a slide mounted thereon for fore and aft sliding motion, a rigid upright standard, means hingedly connecting said standard to the front end portion of said draft member for tilting motion in a direction generally fore and aft of such member, and a flexible operating line anchored at its opposite ends directly to the upper end portion of said standard and to said slide for pulling the latter forward along said draft member in response to forward tilt of said standard relative to the draft member.

6. In an attachment for a tractor having a power operated link pivoted on its rear portion to swing generally up and down about a horizontal axis, the combination of a draft member having a slide mounted thereon for fore and aft sliding motion, a standard, means hingedly connecting said standard to the front end portion of said draft member for tilting motion in a direction generally fore and aft of such member, an operating connection between the upper end portion of said standard and said slide, and means for detachably securing said standard rigidly to the tractor borne link at a point located rearwardly of said axis of swing for the link, to thereby effect a fore and aft tilting motion of said standard as the link is swung about said axis.

7. In an attachment for a tractor having a power operated link pivoted on its rear portion to swing generally up and down about a horizontal axis, the combination of a draft member having a slide mounted thereon for fore and aft sliding motion, a standard, means hingedly connecting said standard to the front end portion of said draft member for tilting motion in a direction generally fore and aft of such member while affording lateral swinging motion of the draft member relative to said standard, a flexible operating line anchored at its opposite ends to the upper end portion of said standard and to said slide for pulling the latter forward along said draft member in response to forward tilt of said standard relative to the draft member, and means for detachably securing said standard rigidly to the tractor borne link, to thereby effect tilting motion of said standard fore and aft of said draft member as the link is swung about its pivot.

8. In an attachment for a tractor having a power operated link pivoted on its rear portion to swing generally up and down about a horizontal axis, the combination of an implement draft member having a slide mounted thereon for fore and aft sliding motion, a ground working member, means including a frame rigidly connected with said draft member for supporting said ground working member for positional adjustment relative to said draft member, means operable in response to motion of said slide along said draft member for shifting the position of said ground working member, a standard, means hingedly connecting said standard to the front end portion of said draft member for tilting motion in a direction generally fore and aft of such member while affording lateral swinging motion of the draft member relative to said standard, a flexible operating line anchored at its opposite ends to the upper end portion of said standard and to said slide for pulling the latter forward along said draft member in response to forward tilt of said standard relative to the draft member, and means for detachably securing said standard rigidly to the tractor borne link, to thereby effect tilting motion of said standard fore and aft of said draft member as the link is swung about its pivot.

9. In an attachment for a tractor having a power operated link pivoted on its rear portion to swing generally up and down about a horizontal axis, the combination of a draft member having a slide mounted thereon for fore and aft sliding motion, a plurality of gangs of harrow disks, means including a frame rigidly connected with said draft member for pivotally supporting said gangs to move to ground working angled positions upon forward propulsion of the frame by the draft member, means operable in response to forward motion of said slide along said draft member to cause said gangs to take up positions at substantially zero disk angle, a standard, means hingedly connecting said standard to the front end portion of said draft member for tilting motion in a direction generally fore and aft of such member while affording lateral swinging motion of the draft member relative to said standard, a flexible operating line anchored at its opposite ends to the upper end portion of said standard and to said slide for pulling the latter forward along said draft member in response to forward tilt of said standard relative to the draft member, and means for detachably securing said standard rigidly to the tractor borne link, to thereby effect tilting motion of said standard fore and aft of said draft member as the link is swung about its pivot.

10. The combination of a drawbar adapted to extend transversely between the trailing ends of a pair of horizontally spaced vertically swingable links projecting rearwardly from a tractor, means for securing the opposite ends of said drawbar to respective ones of the links, a draft pivot, means including a compression member rigid with said drawbar and projecting forwardly therefrom for supporting said pivot adjacent the rear end of the tractor, and supporting means projecting laterally from said pivot and engageable with the intermediate portions of the links, said supporting means being displaceable under stress longitudinally of said links but including means for preventing said pivot from moving relative to the plane of the links.

11. The combination with a generally flat framework adapted to be rigidly secured to a horizontally spaced pair of links pivoted on the rear portion of a tractor and comprising a pair of rigidly joined front and rear transverse bars together with an upright standard projecting upward from the front bar and connected by braces with the rear bar, of a trailing draft member pivotally connected to the central portion of the front bar for fore and aft rocking motion relative thereto and having a slide thereon movable fore and aft of the draft member and operatively connected with the upper end of said standard.

12. A removable hitch attachment in the form of a flat framework adapted to extend transversely between the trailing ends of a pair of horizontally spaced vertically swingable links pivoted to the rear end portion of a tractor, such framework comprising a pair of rigidly joined front and rear bars dimensioned to span the pair of links, said rear bar including trunnions for the pivotal engagement of the trailing ends of said links, a draft connection on the central portion of said front bar, said front bar having means at its ends for the engagement of the respective intermediate portions of said links to prevent movement of said bar relative to the plane of said links but allowing relative sliding movement under stress so that a draft load applied to said draft connection is substantially completely assumed by said rear bar.

13. In a hitch for operatively connecting an implement with a tractor having power actuated, vertically swingable links trailing rearwardly from the tractor, the combination of draft means mounted on said links for connecting said implement to said tractor through said links including a transverse member spanning said links forwardly of their rear ends, means for supporting the ends of said transverse member on said links, means for trailingly connecting an implement drawbar to said transverse member, and a standard rising from said transverse member and having its upper end connected to a rearwardly extending member leading to an implement part to transmit to said implement part a force resulting from the swing of said standard and independent of the implement draft connection with said transverse member.

14. In a hitch for connecting an implement with a tractor having laterally spaced, power operated, vertically swingable links trailing therefrom, the combination of a frame adapted for connection to the rear ends of said links and including a crossbar engaging said links substantially in advance of their rear ends, connecting means on said crossbar for attaching the forward end of an implement draft beam pivotally to said frame and at a point closely adjacent the rear end of said tractor, a standard extending upwardly from the front portion of said frame and rigidly mounted thereon, and means for directly connecting a tension force transmitting member to the upper end of said standard so that the force transmitting member moves bodily forward with said upper end of said standard upon vertical swing of said links.

15. In a hitch for connecting an implement to a tractor having laterally spaced, power operated, vertically swingable draft links trailing therefrom, the combination of a hitch frame positionable between said links and arranged for connection with the rear ends thereof, said frame including a transversely extending draft member supported by said links near the tractor so that the vertical movement of said draft member is substantially less than that of the rear ends of the links, a draft connection for an implement on said draft member, an upright on said draft member of such length that its upper end moves in an arc upwardly and forwardly as said links swing vertically upwardly, and means at the upper end of said standard for direct connection with the implement to translate to a force in tension said upward and forward movement of said standard.

16. In a hitch mechanism for use with a tractor having a pair of draft links trailingly pivoted side by side on the rear end portion thereof and having a power lift for swinging the links vertically, the combination comprising a drawbar arranged to extend transversely between the trailing ends of the draft links for detachable connection thereto, a crossbar arranged generally parallel to said drawbar and spanning said links, said crossbar including a disengageable coupling at each of its ends for gripping engagement of the draft links at the respective central portions thereof, the gripping engagement of said couplings serving to prevent displacement of said crossbar in a direction out of the plane of said links, means for connecting the forward end of a draft member to the central portion of said crossbar for pivotal motion relative thereto about a point closely adjacent the rear end of the tractor, and compression members rigidly secured to said crossbar and extending rearwardly therefrom into engagement with said drawbar for limiting rearward movement of said crossbar upon the application of draft force.

AUGUSTA P. McKAY.

REFERENCES CITED

The following references are of record in the file of this patent:

UNITED STATES PATENTS

| Number | Name | Date |
| --- | --- | --- |
| 1,015,544 | Cox | Jan. 23, 1912 |
| 1,505,201 | Johnson | Aug. 19, 1924 |
| 1,715,682 | Starks | June 4, 1929 |
| 2,158,316 | Alexander | May 16, 1939 |
| 2,247,534 | Von Schlegell | July 1, 1941 |
| 2,312,258 | Martin | Feb. 23, 1943 |
| 2,337,801 | Cook | Dec. 28, 1943 |
| 2,341,807 | Olmstead et al. | Feb. 15, 1944 |
| 2,343,482 | Simonka | Mar. 7, 1944 |
| 2,351,168 | Warne | June 13, 1944 |